United States Patent
Huang et al.

(10) Patent No.: US 11,906,843 B1
(45) Date of Patent: Feb. 20, 2024

(54) BACKLIGHT MODULE

(71) Applicant: DARWIN PRECISIONS CORPORATION, Hsinchu County (TW)

(72) Inventors: Tun-Lien Huang, Hsinchu County (TW); Meng-Hui Chen, Hsinchu County (TW); Shih-Chieh Su, Hsinchu County (TW); Ya-Fang Huang, Hsinchu County (TW)

(73) Assignee: DARWIN PRECISIONS CORPORATION, Hsinchu County (TW)

( * ) Notice: Subject to any disclaimer, the term of this patent is extended or adjusted under 35 U.S.C. 154(b) by 0 days.

(21) Appl. No.: 18/135,759

(22) Filed: Apr. 18, 2023

(30) Foreign Application Priority Data

Nov. 18, 2022 (TW) .................................. 111144235

(51) Int. Cl.
- *G02F 1/133* (2006.01)
- *G02F 1/13357* (2006.01)
- *F21V 8/00* (2006.01)
- *G02F 1/1335* (2006.01)

(52) U.S. Cl.
CPC ..... *G02F 1/133603* (2013.01); *G02B 6/0043* (2013.01); *G02F 1/133605* (2013.01); *G02F 1/133607* (2021.01)

(58) Field of Classification Search
CPC .. G02B 6/0036; G02B 6/0053; G02B 6/0076; G02B 6/0043; G02F 1/1323
See application file for complete search history.

(56) References Cited

U.S. PATENT DOCUMENTS

| | | | |
|---|---|---|---|
| 10,795,073 B2 | 10/2020 | Chen et al. | |
| 2006/0164862 A1* | 7/2006 | Chien | G02B 6/0038 362/619 |
| 2009/0180282 A1* | 7/2009 | Aylward | G02F 1/133605 362/245 |
| 2009/0185389 A1* | 7/2009 | Tessnow | G02B 6/0038 362/516 |
| 2010/0259485 A1* | 10/2010 | Chuang | G02B 6/006 345/173 |
| 2013/0033901 A1* | 2/2013 | Nishitani | G02F 1/133615 362/613 |
| 2019/0361164 A1* | 11/2019 | Jo | G02B 6/0065 |
| 2020/0124886 A1* | 4/2020 | Song | G02B 6/0068 |

FOREIGN PATENT DOCUMENTS

| | | |
|---|---|---|
| TW | I391717 B | 4/2013 |
| TW | M556333 U | 3/2018 |
| TW | I680320 B | 12/2019 |

* cited by examiner

*Primary Examiner* — Julie A Bannan (57) ABSTRACT

A backlight module includes three light emitting elements, an inverse prism sheet and a light guide assembly. The light guide assembly is disposed opposite to the inverse prism sheet and includes three light guide plates. A first surface of the first light guide plate opposite to the inverse prism sheet has a first sunken eye structure having a first long axis extending along a reference direction. A second surface of the second light guide plate opposite to the inverse prism sheet has a second sunken eye structure having a second long axis. A third surface of the third light guide plate opposite to the inverse prism sheet has a third sunken eye structure having a third long axis. Orthographic projections of the second long axis and the third long axis on the first surface are inclined towards two opposite sides of the reference direction.

9 Claims, 9 Drawing Sheets

BACKLIGHT MODULE

CROSS-REFERENCE TO RELATED APPLICATION

This application claims the priority benefit of Taiwan application No. 111144235, filed on Nov. 18, 2022. The entirety of the above-mentioned patent application is hereby incorporated by reference herein and made a part of this specification.

FIELD OF THE INVENTION

The present invention relates to a light source module, and more particularly to a backlight module.

BACKGROUND OF THE INVENTION

A liquid crystal display mainly includes a backlight module, a display panel, and an outer frame, etc. The backlight module may include an edge type backlight module and a direct type backlight module according to different directions of light emitting elements. Further, since the edge type backlight module has the advantages of small thickness and low cost, the screens using the edge type backlight module have been widely used in daily life.

Because many electronic products are configured with screens in daily life, and the above electronic products are also widely used in work or public places, many screens will provide additional anti-peeping functions to prevent information on the screens from being peeped by others. However, most of the anti-peeping functions in prior art are achieved by reducing the light emitting brightness of the backlight module, resulting in degradation of the image quality of the screens.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The present invention provides a backlight module to provide a function of switching multiple visual angles and to reduce an overall light emitting angle without reducing the light emitting brightness.

The backlight module provided by the present invention includes a first light emitting element, a second light emitting element, a third light emitting element, an inverse prism sheet, and a light guide assembly. The light guide assembly is disposed opposite to the inverse prism sheet, and includes a first light guide plate, a second light guide plate, and a third light guide plate. The first light guide plate has a first light incidence surface and a first surface. The first light incidence surface is disposed opposite to the first light emitting element. The first surface is connected to the first light incidence surface and is located at a side of the first light guide plate opposite to the inverse prism sheet. The first surface is formed with a first sunken eye structure, and the first sunken eye structure has two first eye corner portions opposite to each other. A first long axis is formed by a connecting line between the two first eye corner portions, and the first long axis extends along a reference direction. The second light guide plate has a second light incidence surface and a second surface. The second light incidence surface is disposed opposite to the second light emitting element. The second surface is connected to the second light incidence surface and is located at a side of the second light guide plate opposite to the inverse prism sheet. The second surface is formed with a second sunken eye structure, and the second sunken eye structure has two second eye corner portions opposite to each other. A second long axis is formed by a connecting line between the two second eye corner portions. The third light guide plate has a third light incidence surface and a third surface. The third light incidence surface is disposed opposite to the third light emitting element. The third surface is connected to the third light incidence surface and is located at a side of the third light guide plate opposite to the inverse prism sheet. The third surface is formed with a third sunken eye structure, and the third sunken eye structure has two third eye corner portions opposite to each other. A third long axis is formed by a connecting line between the third second eye corner portions. An orthographic projection of the second long axis on the first surface and an orthographic projection of the third long axis on the first surface are respectively inclined towards two opposite sides of the reference direction.

The first light guide plate, the second light guide plate, and the third light guide plate are used in the backlight module according to the present invention. In detail, the first light guide plate, the second light guide plate, and the third light guide plate have different light emitting angles, and the light emitting angles of any two of the first light guide plate, the second light guide plate, and the third light guide plate can be superposed with each other by turning on any two of the first light emitting element, the second light emitting element, and the third light emitting element. Therefore, the backlight module according to the present invention can provide a function of multiple visual angles switching without reducing the brightness. In addition, because the inverse prism sheet is further used in the backlight module according to the present invention to reduce a light emitting angle of the backlight module, the backlight module according to the present invention further has the advantage of the small light emitting angle.

Other objectives, features and advantages of The invention will be further understood from the further technological features disclosed by the embodiments of The invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
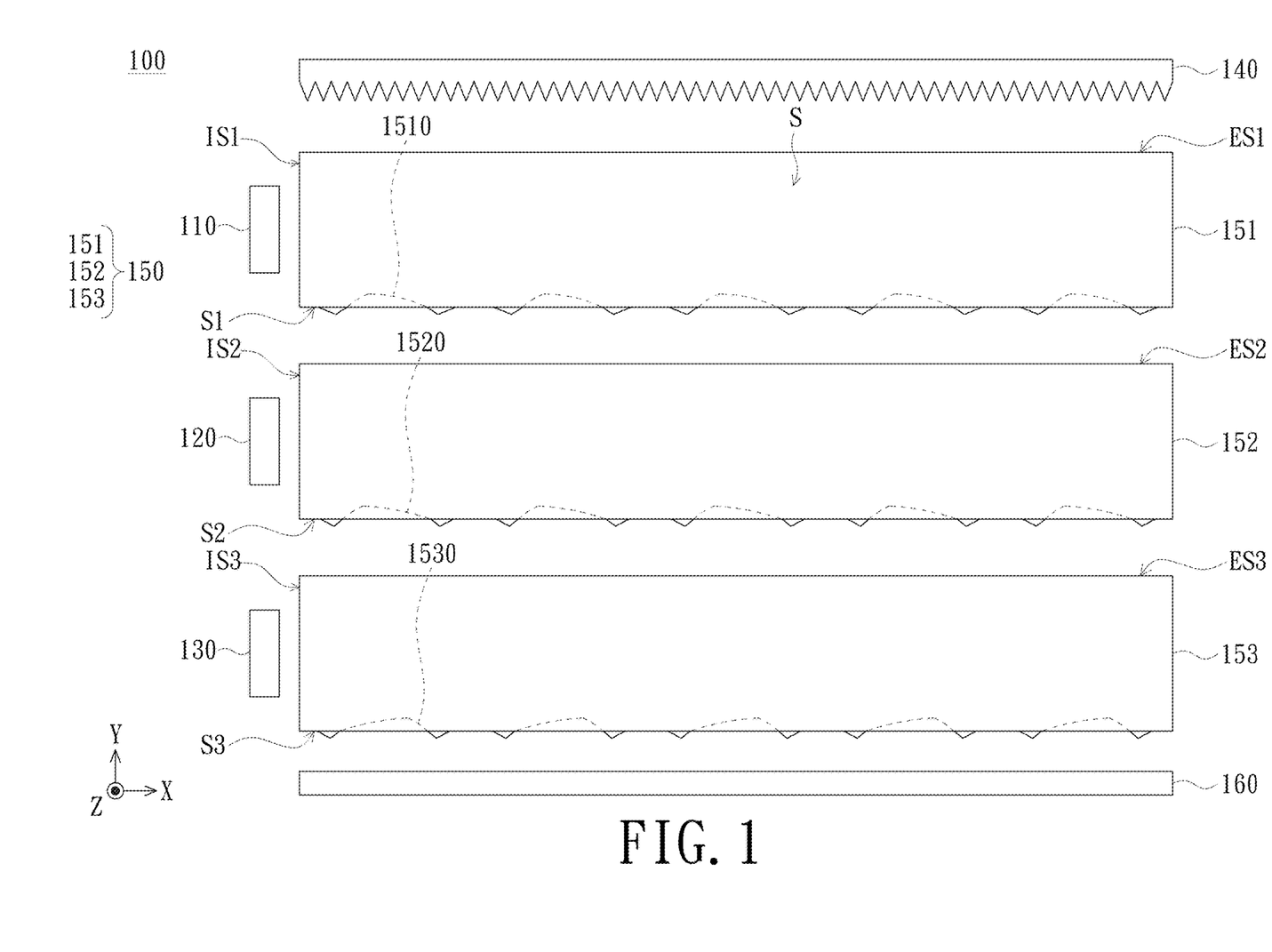
FIG. 1 is a schematic diagram of a backlight module according to an embodiment of the present invention.
Figure 2:
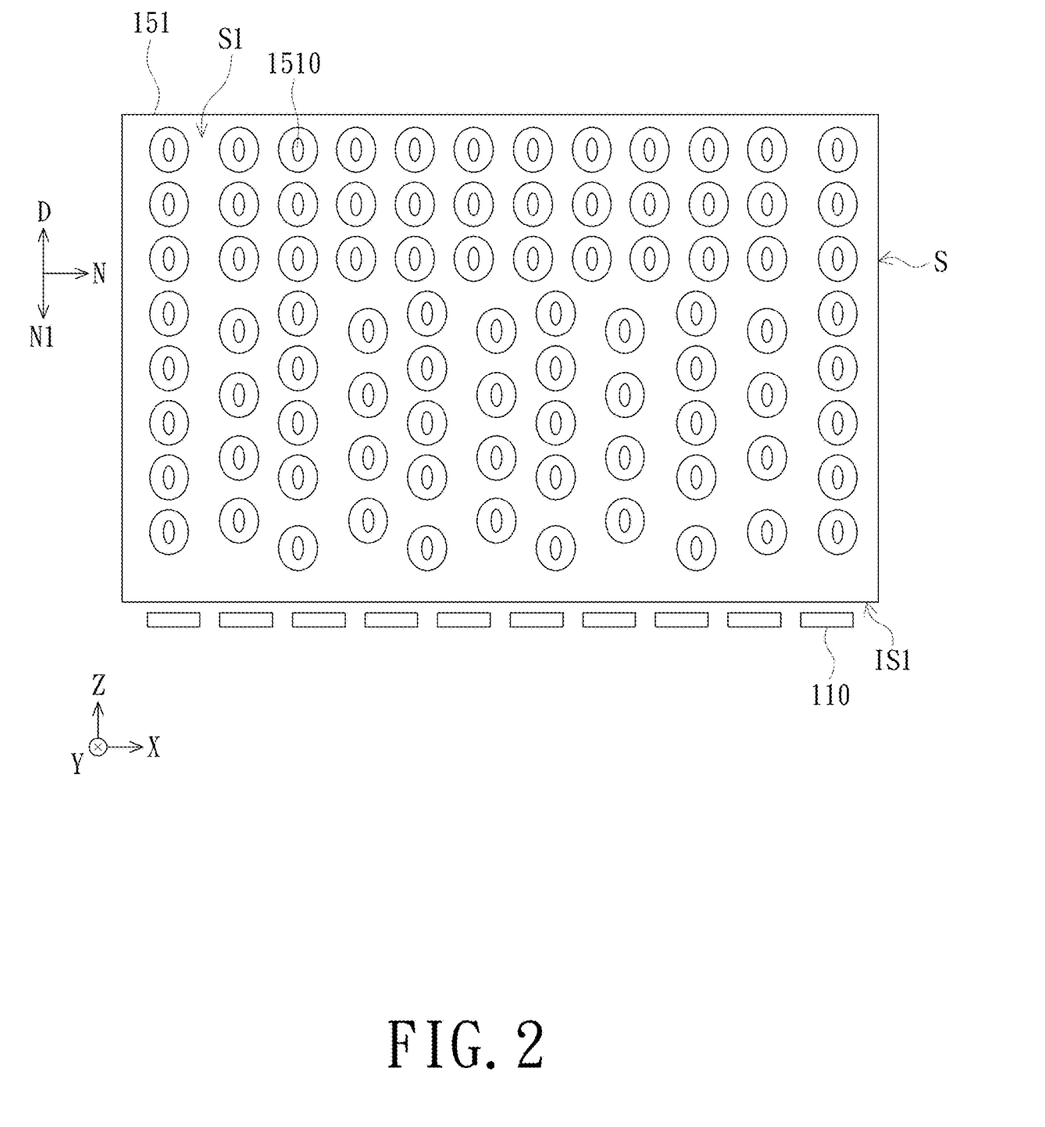
FIG. 2 is a bottom view of the first light guide plate in FIG. 1.
Figure 3:
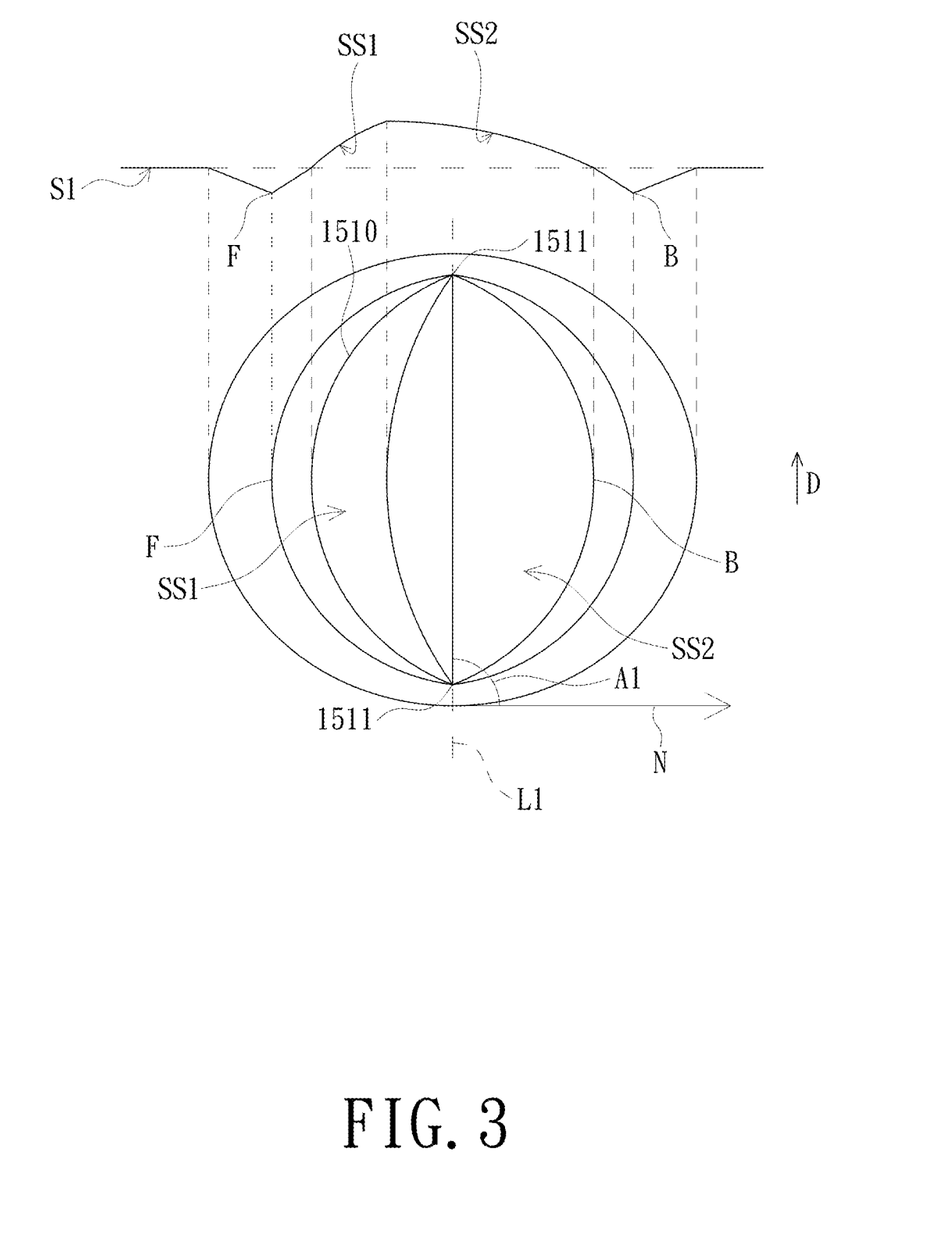
FIG. 3 is an enlarged schematic diagram of the first sunken eye structure in FIG. 2.
Figure 4:
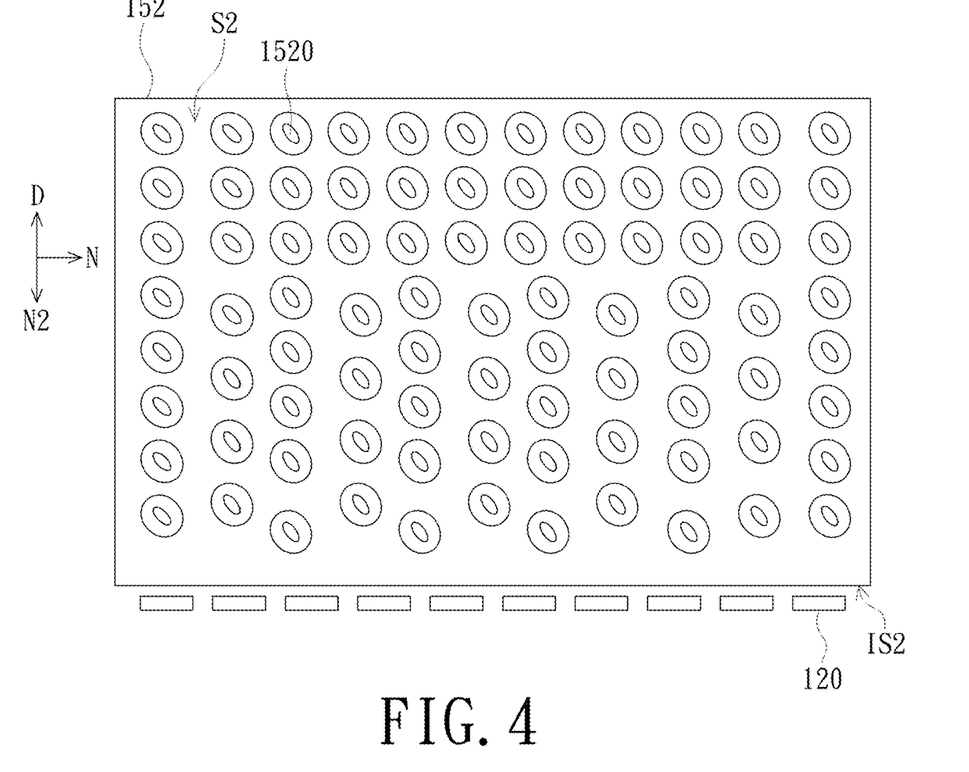
FIG. 4 is a bottom view of the second light guide plate in FIG. 1.
Figure 5:
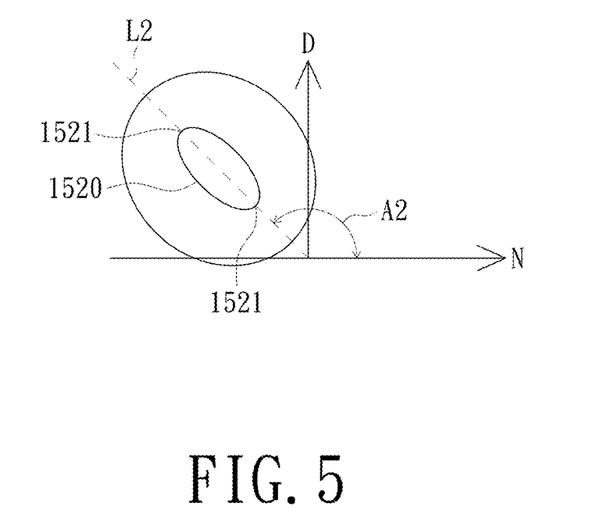
FIG. 5 is an enlarged schematic diagram of the second sunken eye structure in FIG. 4.
Figure 6:
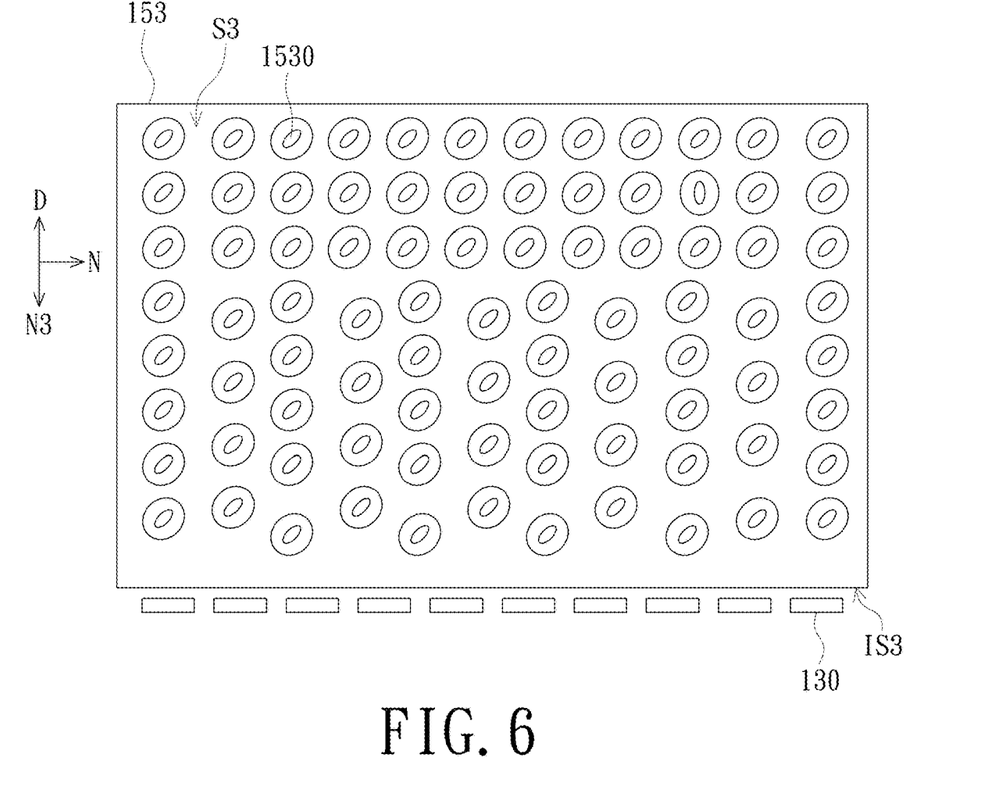
FIG. 6 is a bottom view of the third light guide plate in FIG. 1.
Figure 7:
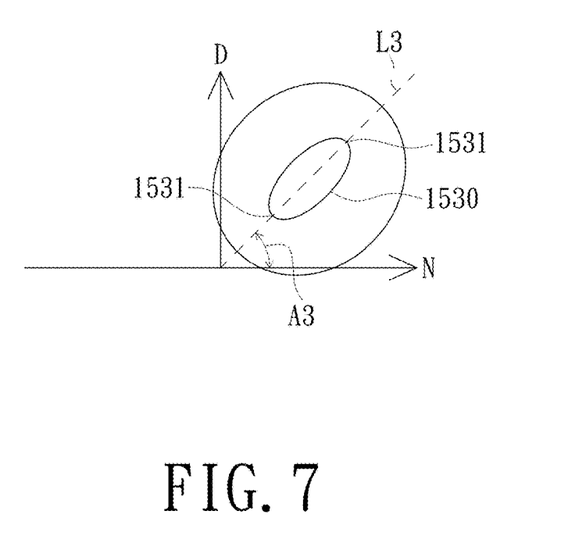
FIG. 7 is an enlarged schematic diagram of the third sunken eye structure in FIG. 6.

FIG. 1 is a schematic diagram according to an embodiment of the present invention. FIG. 2 is a bottom view of the first light guide plate in FIG. 1. FIG. 3 is an enlarged schematic diagram of the first sunken eye structure in FIG. 2. FIG. 4 is a bottom view of the second light guide plate in FIG. 1. FIG. 5 is an enlarged schematic diagram of the second sunken eye structure in FIG. 4. FIG. 6 is a bottom view of the third light guide plate in FIG. 1. FIG. 7 is an enlarged schematic diagram of the third sunken eye structure in FIG. 6.

Referring to FIG. 1 first, the backlight module 100 includes a first light emitting element 110, a second light emitting element 120, a third light emitting element 130, an inverse prism sheet 140, and a light guide assembly 150. The light guide assembly 150 is disposed opposite to the inverse prism sheet 140. The light guide assembly 150 includes a first light guide plate 151, a second light guide plate 152, and a third light guide plate 153. The first light guide plate 151 has a first light incidence surface IS1 and a first surface S1. The first light incidence surface IS1 is disposed opposite to the first light emitting element 110. The first surface S1 is connected to the first light incidence surface IS1, and the first surface S1 is located at a side of the first light guide plate 151 opposite to the inverse prism sheet 140. Referring to FIG. 2 and FIG. 3, the first surface S1 is formed with at least one first sunken eye structure 1510 (also drawn in FIG. 1), while this embodiment takes a plurality of first sunken eye structures 1510 as an example. Each first sunken eye structure 1510 has two first eye corner portions 1511 opposite to each other. A first long axis L1 is formed by a connecting line between the two first eye corner portions 1511, and the first long axis L1 extends along a reference direction D. Referring to FIG. 1 again, the second light guide plate 152 has a second light incidence surface IS2 and a second surface S2. The second light incidence surface IS2 is disposed opposite to the second light emitting element 120. The second surface S2 is connected to the second light incidence surface IS2, and the second surface S2 is located at a side of the second light guide plate 152 opposite to the inverse prism sheet 140. Referring to FIG. 4 and FIG. 5, the second surface S2 is formed with at least one second sunken eye structure 1520 (also drawn in FIG. 1), while this embodiment takes a plurality of second sunken eye structures 1520 as an example. Each second sunken eye structure 1520 has two second eye corner portions 1521 opposite to each other. A second long axis L2 is formed by a connecting line between the two second eye corner portions 1521. Referring to FIG. 1 again, the third light guide plate 153 has a third light incidence surface IS3 and a third surface S3. The third light incidence surface IS3 is disposed opposite to the third light emitting element 130. The third surface S3 is connected to the third light incidence surface IS3 and is located at a side of the third light guide plate 153 opposite to the inverse prism sheet 140. Referring to FIG. 6 and FIG. 7, the third surface S3 is formed with at least one third sunken eye structure 1530 (also drawn in FIG. 1), while this embodiment takes a plurality of third sunken eye structures 1530 as an example. Each third sunken eye structure 1530 has two third eye corner portions 1531 opposite to each other. A third long axis L3 is formed by a connecting line between the two third eye corner portions 1531. As shown in FIG. 5 and FIG. 7, an orthographic projection of the second long axis L2 on the first surface S1 and an orthographic projection of the third long axis L3 on the first surface S1 are respectively inclined towards two opposite sides of the reference direction D.

Referring to FIG. 1 again, the first light emitting element 110, the second light emitting element 120, and the third light emitting element 130 may include light emitting diodes, but in other embodiments, the first light emitting element 110, the second light emitting element 120, and the third light emitting element 130 may alternatively be other types of light emitting elements. In addition, in an embodiment, the first light emitting element 110, the second light emitting element 120, and the third light emitting element 130 may respectively be an unpackaged light emitting chip cut from a wafer, such as a light emitting diode chip. For example, the light emitting diode chip may be a grain-level nitride light emitting diode chip that emits blue light at a dominant wavelength, but the present invention is not limited thereto. In addition, the first light emitting elements 110, the second light emitting elements 120, and the third light emitting elements 130 in this embodiment may respectively be disposed in an array, and the number of the first light emitting elements 110, the number of the second light emitting elements 120, and the number of the third light emitting elements 130 are not limited in the present invention.

For the light guide assembly 150 in this embodiment, the first light guide plate 151, the second light guide plate 152, and the third light guide plate 153 can respectively provide different light emitting angles, wherein the light emitting angle of the first light guide plate 151 may be closer to forward light emitting than the light emitting angle of the second light guide plate 152 and the light emitting angle of the third light guide plate 153. For example, the first light guide plate 151 further has a first light emitting surface ES1; the first light emitting surface ES1 is connected to the first light incidence surface IS1, and the first light emitting surface ES1 is opposite to the first surface S1. In an embodiment, a half intensity angle of a light beam emitting from the first light emitting surface ES1 of the first light guide plate 151 generated by the first light emitting element 110 may be about in a range from −22° to 22°, and a central angle of the light beam is, for example, about 0°. Similarly, a half intensity angle of a light beam emitting from a second light emitting surface ES2 of the second light guide plate 152 generated by the second light emitting element 120 may be about in a range from −30° to 14°, and a central angle of the light beam may be about −8°; a half intensity angle of a light beam emitting from a third light emitting surface ES3 of the third light guide plate 153 generated by the third light emitting element 130 may be about in a range from −14° to 30°, and a central angle of the light beam may be about 8°. Hence, when one of the first light emitting element 110, the second light emitting element 120 and the third light emitting element 130 is turned on, the backlight module 100 can respectively provide three different light-emitting angles. In more detail, when the first light emitting element 110 and the second light emitting element 120 are both turned on, the backlight module 100 can provide a light emitting angle superposed by the first light guide plate 151 and the second light guide plate 152; similarly, when the first light emitting element 110 and the third light emitting element 130 are both turned on, the backlight module 100 can provide a light emitting angle superposed by the first light guide plate 151 and the third light guide plate 153. Incidentally, the first light guide plate 151 may be closer to the inverse prism sheet 140 than the second light guide plate 152 and the third light guide plate 153 in this embodiment. Hence, when the first light emitting element 110 is turned on independently so as to use the light emitting angle of the first light guide plate 151, a path of the light beam emitting from the first light emitting surface ES1 of the first light guide plate 151 is not interfered by the second light guide plate 152 and the third light guide plate 153.

The first light guide plate 151, the second light guide plate 152, and the third light guide plate 153 respectively provide different light emitting angles by the first sunken eye structures 1510, the second sunken eye structures 1520, and the third sunken eye structures 1530. Since features of the first sunken eye structures 1510, the second sunken eye structures 1520, and the third sunken eye structures 1530 are similar to one another, only the features of the first sunken eye structures 1510 are described below, and the features of the second sunken eye structures 1520 and the third sunken eye structures 1530 are omitted herein. Referring to FIG. 3 again, the first sunken eye structures 1510 are, for example, recessed from the first surface S1, and the first sunken eye structures 1510 may be shaped like a half rugby football. On the other hand, the first surface S1 of the first light guide plate 151 may further be formed with a plurality of front domes F and a plurality of back domes B, wherein each front dome F and each back dome B may be protruded from the first surface S1, and the front domes F may be closer to the first light incidence surface IS1 than the back domes B. In addition, each first sunken eye structure 1510 may be located between each front dome F and each back dome B. In detail, the first eye corner portion 1511 is, for example, close to junction of the front dome F and the back dome B. Incidentally, each first sunken eye structure 1510 may further have a first slope surface SS1 and a second slope surface SS2, wherein the first slope surface SS1 is connected to the front dome F, and the second slope surface SS2 is connected to the back dome B. In this embodiment, the first slope surface SS1 and the second slope surface SS2 may be curved surfaces, and an area of the first slope surface SS1 and an area of the second slope surface SS2 may be different from each other, but these details are not limited in the present invention.

Referring to FIG. 1 and FIG. 2 again, in this embodiment, the first light guide plate 151 further has, for example, a side surface S. The side surface S is connected to the first light incidence surface IS1, the first light emitting surface ES1, and the first surface S1. As shown in FIG. 3, an angle between the first long axis L1 and a normal N of the side surface S is A1, and in an embodiment, 80°≤A1≤100°. Referring to FIG. 4 and FIG. 5 together, an angle between the second long axis L2 and the normal N is A2, and 100°<A2<180° in an embodiment. Referring to FIG. 6 and FIG. 7 together, an angle between the third long axis L3 and the normal N is A3, and 0°<A3<80° in an embodiment. Further, referring to FIG. 5 and FIG. 7 together, 130°<A2<140° and 40°<A3<50° in an embodiment; for example, A2 may be about 135° and A3 may be about 45° in another embodiment, but these details are not limited in the present invention.

Referring to FIG. 2 again, the first sunken eye structures 1510 are disposed not equidistantly in a normal N1 of the first light incidence surface IS1. For example, in this embodiment, a distance between the first sunken eye structures 1510 at a part close to the first light incidence surface IS1 is larger than a distance between the first sunken eye structures 1510 at a part away from the first light incidence surface IS1. In detail, since there are a larger number of light beams passing through the part of the first light guide plate 151 close to the first light incidence surface IS1, the first sunken eye structures 1510 may be disposed more dispersedly at the part of the first surface S1 close to the first light emitting element 110. On the contrary, because there are a smaller number of light beams passing through the part of the first light guide plate 151 away from the first light incidence surface IS1, the first sunken eye structures 1510 may be disposed more intensively at the part of the first surface S1 away from the first light emitting element 110. However, in an embodiment, the first sunken eye structures 1510 may be equidistantly disposed in the normal N1 of the first light incidence surface IS1.

On the other hand, as shown in FIG. 4, the second sunken eye structures 1520 are disposed not equidistantly in a normal N2 of the second light incidence surface IS2; further, a distance between the second sunken eye structures 1520 at a part close to the second light incidence surface IS2 is larger than a distance between the second sunken eye structures 1520 at a part away from the second light incidence surface IS2. Hence, the light emitting brightness of the second light emitting surface ES2 of the second light guide plate 152 can be more uniform. However, in an embodiment, the second sunken eye structures 1520 may be equidistantly disposed in the normal N2 of the second light incidence surface IS2.

Similarly, as shown in FIG. 6, the third sunken eye structures 1530 are disposed not equidistantly in a normal N3 of the third light incidence surface IS3; for example, a distance between the third sunken eye structures 1530 at a part close to the third light incidence surface IS3 is larger than a distance between the third sunken eye structures 1530 at a part away from the third light incidence surface IS3, so that the light emitting brightness of the third light emitting surface ES3 of the third light guide plate 153 can be more uniform. It can be understood that in other embodiments, the third sunken eye structures 1530 may be equidistantly disposed in the normal N3 of the third light incidence surface IS3.

Referring to FIG. 1 again, the light emitting angle can be further reduced by the inverse prism sheet 140 so as to further improve the anti-peeping effect. In detail, the inverse prism sheet 140 may include a plate body and a plurality of prisms, wherein the above prisms are, for example, disposed side by side on the above plate body, and the above prisms are protruded toward the first light guide plate 151.

Compared to the prior art, the first light guide plate 151, the second light guide plate 152, and the third light guide plate 153 are used in the backlight module 100 according to this embodiment. In detail, the first light guide plate 151, the second light guide plate 152, and the third light guide plate 153 have different light emitting angles, and the light emitting angles of any two of the first light guide plate 151, the second light guide plate 152, and the third light guide plate 153 can be superposed with each other by turning on any two of the first light emitting element 110, the second light emitting element 120, and the third light emitting element 130. Therefore, the backlight module 100 can provide a function of multiple visual angles switching without reducing the brightness. In addition, because the inverse prism sheet 140 is further used in the backlight module 100 to reduce a light emitting angle of the backlight module 100, the backlight module 100 further has the advantage of the small light emitting angle.

Incidentally, the backlight module 100 further includes, for example, a reflective plate 160. The reflective plate 160 is disposed on a side of the light guide assembly 150 that is opposite to the inverse prism sheet 140, so as to increase the light utilization. In this embodiment, a material of the reflective plate 160 may include silver, but the present invention is not limited thereto.

Figure 8:
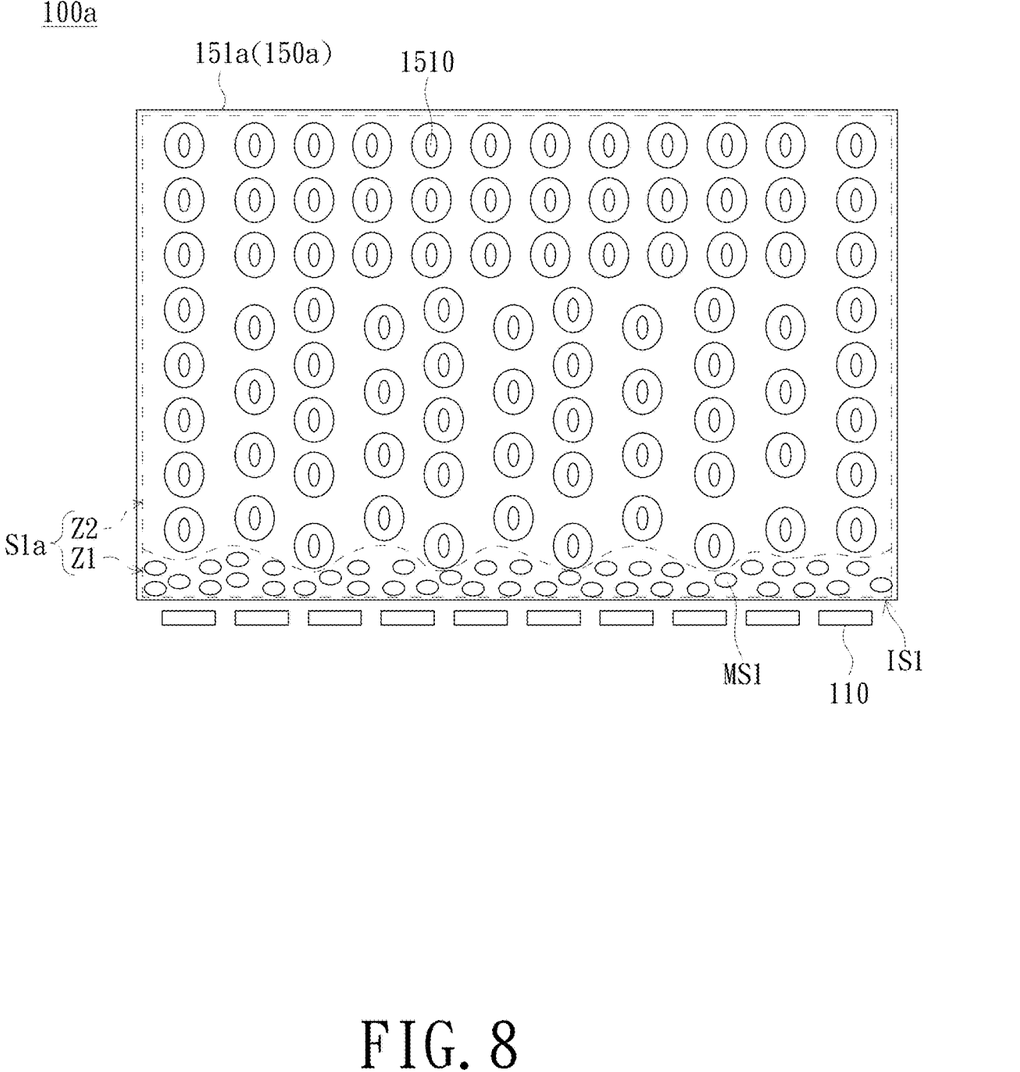
FIG. 8 is a schematic diagram of a first light guide plate of a backlight module according to another embodiment of the present invention.
Figure 9:
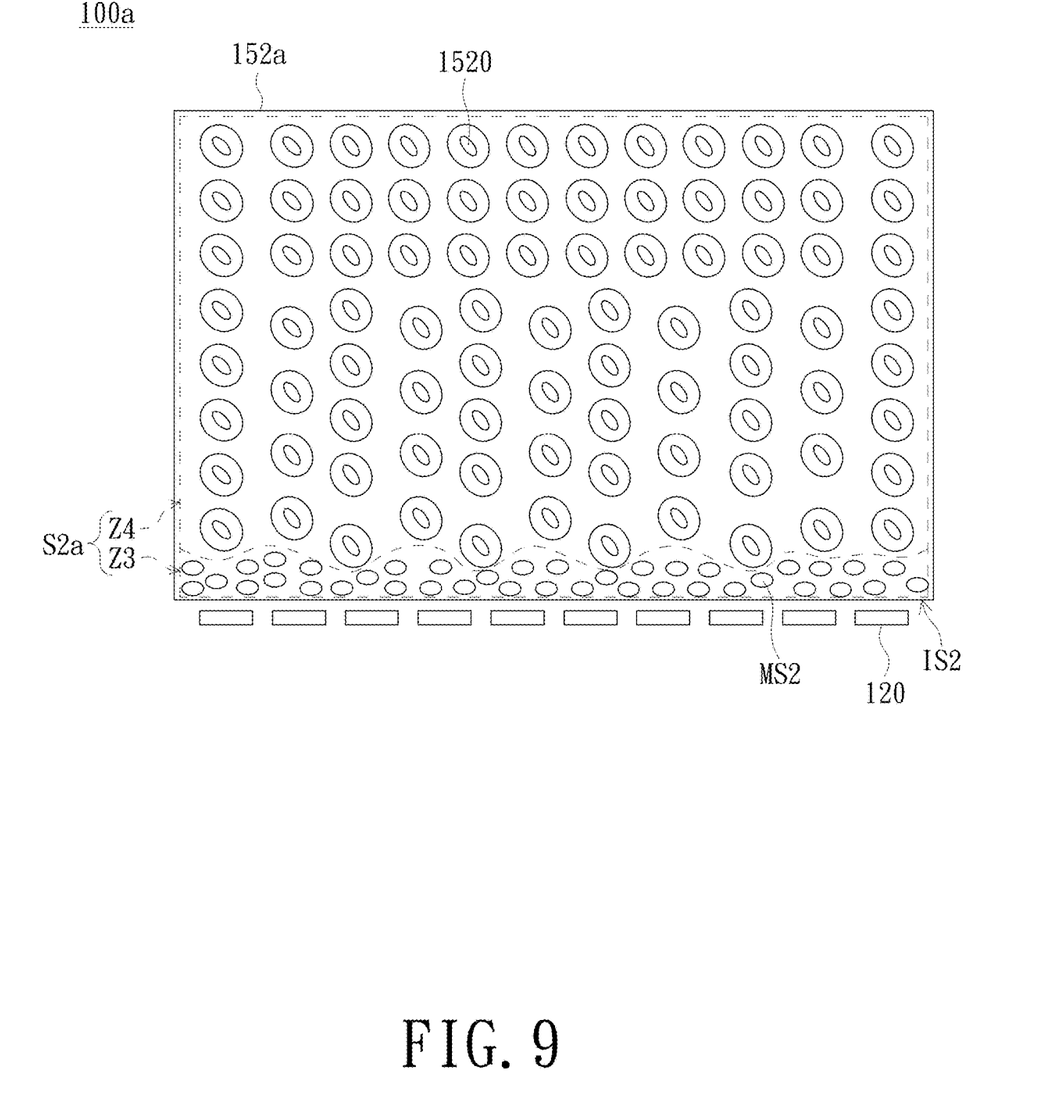
FIG. 9 is a schematic diagram of the second light guide plate of the backlight module in FIG. 8.
Figure 10:
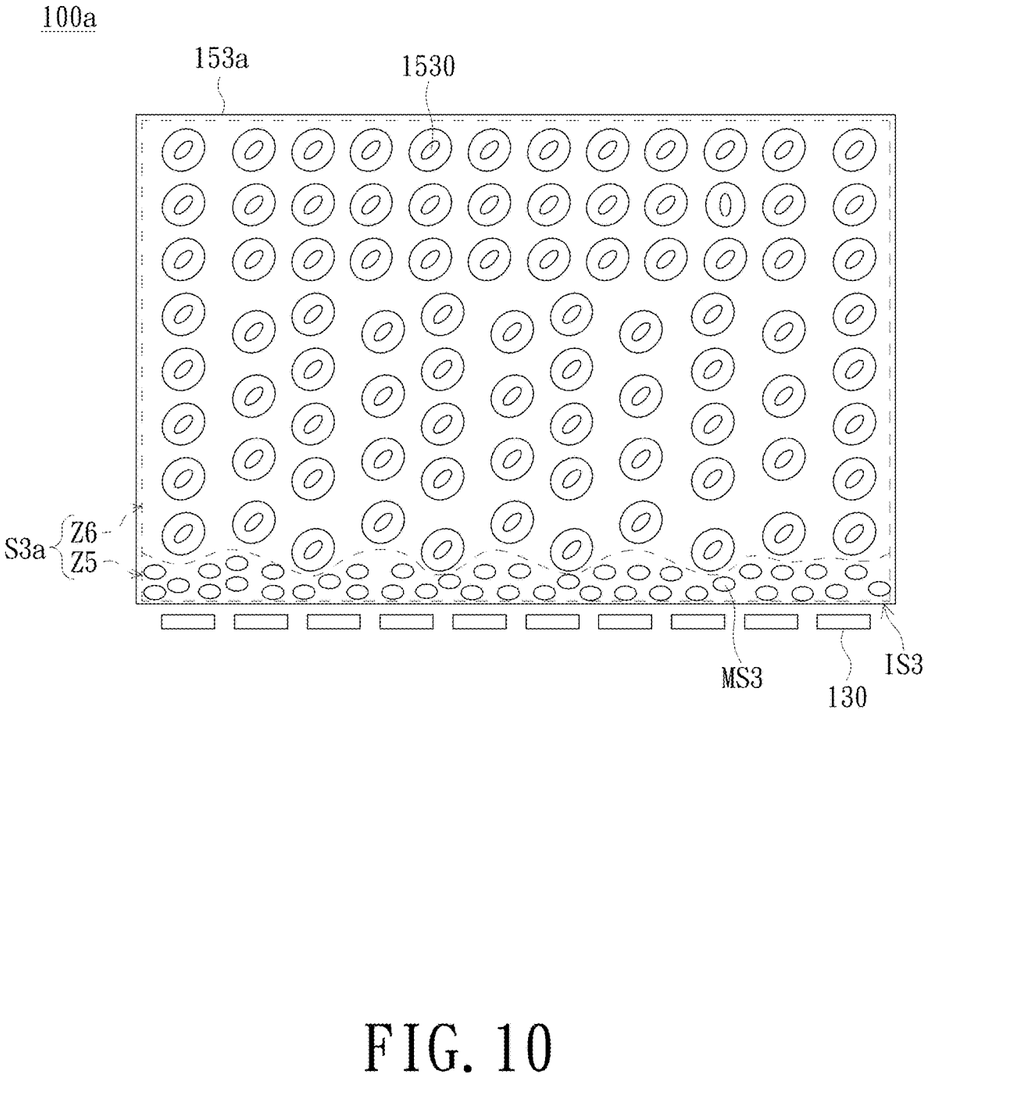
FIG. 10 is a schematic diagram of the third light guide plate of the backlight module in FIG. 8.

FIG. 8 is a schematic diagram of a first light guide plate of a backlight module according to another embodiment of the present invention. FIG. 9 is a schematic diagram of the second light guide plate of the backlight module in FIG. 8. FIG. 10 is a schematic diagram of the third light guide plate of the backlight module in FIG. 8. The structure and advantages of a backlight module 100*a* in this embodiment are similar to those of the embodiment in FIG. 1, and only the differences are described below. Referring to FIG. 8 first, for a light guide assembly 150*a* according to this embodiment, a first light guide plate 151*a* may further include a plurality of first light scattering microstructures MS1. A first surface S1*a* has a first close-to-light emitting element area Z1 and a first away-from-light emitting element area Z2, and the first close-to-light emitting element area Z1 is closer to the first light incidence surface IS1 than the first away-from-light emitting element area Z2. The first sunken eye structures 1510 are formed in the first away-from-light emitting element area Z2, and the first light scattering microstructures MS1 are located in the first close-to-light emitting element area Z1, so that the light emitting brightness of the first light emitting surface ES1 is more uniform. Incidentally, the first light scattering microstructures MS1 may be protruded or be recessed from the first surface S1*a*, which is not limited in the present invention. Similarly, referring to FIG. 9, a second light guide plate 152*a* may further include a plurality of second light scattering microstructures MS2 in this embodiment. A second surface S2*a* has a second close-to-light emitting element area Z3 and a second away-from-light emitting element area Z4, and the second close-to-light emitting element area Z3 is closer to the second light incidence surface IS2 than the second away-from-light emitting element area Z4. The second sunken eye structures 1520 are formed in the second away-from-light emitting element area Z4, and the second light scattering microstructures MS2 are located in the second close-to-light emitting element area Z3, so that the light emitting brightness of the second light emitting surface ES2 is more uniform. It can be understood that since features of the second light scattering microstructures MS2 are similar to those of the first light scattering microstructures MS1, relevant descriptions are omitted herein. Referring to FIG. 10, a third light guide plate 153*a* may further include a plurality of third light scattering microstructures MS3. The third surface S3 has a third close-to-light emitting element area Z5 and a third away-from-light emitting element area Z6, and the third close-to-light emitting element area Z5 is closer to the third light incidence surface IS3 than the third away-from-light emitting element area Z6. The third sunken eye structures 1530 are formed in the third away-from-light emitting element area Z6, and the third light scattering microstructures MS3 are located in the third close-to-light emitting element area Z5, so that the light emitting brightness of the third light emitting surface ES3 is more uniform. Similarly, detailed features of the third light scattering microstructures MS3 are omitted herein.

Figure 11:
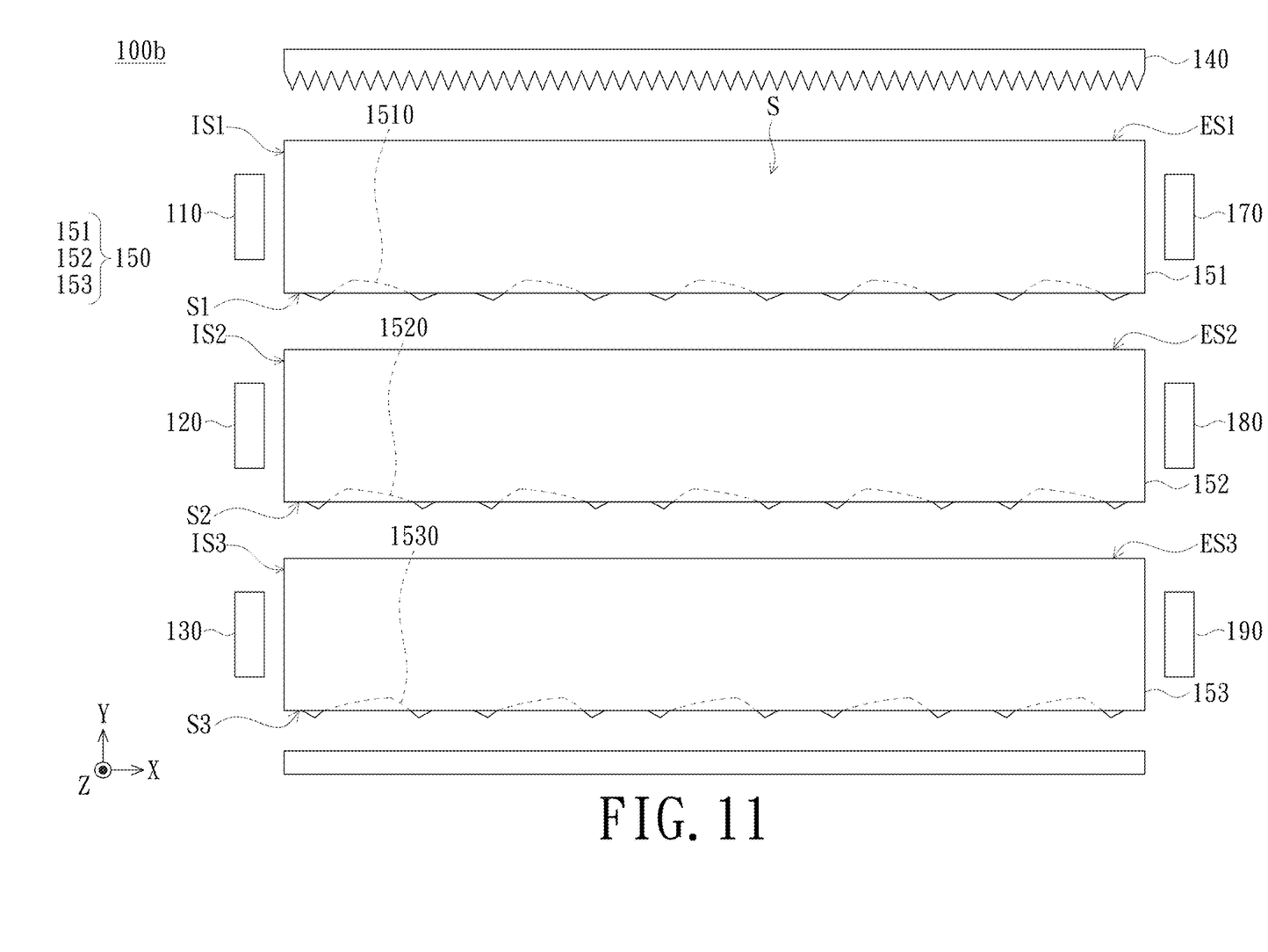
FIG. 11 is a schematic diagram of a backlight module according to another embodiment of the present invention.

FIG. 11 is a schematic diagram of a backlight module according to another embodiment of the present invention. The structure and advantages of a backlight module 100*b* according to this embodiment are similar to those of the embodiment in FIG. 1, and only the differences are described below. Referring to FIG. 11, the backlight module 100*b* may further include a fourth light emitting element 170, a fifth light emitting element 180, and a sixth light emitting element 190. The fourth light emitting element 170 and the first light emitting element 110 are disposed on two opposite sides of the first light guide plate 151. The fifth light emitting element 180 and the second light emitting element 120 are disposed on two opposite sides of the second light guide plate 152. The sixth light emitting element 190 and the third light emitting element 130 are disposed on two opposite sides of the third light guide plate 153. In this way, the light emitting brightness of the first light guide plate 151, the second light guide plate 152, and the third light guide plate 153 can be further increased. It can be understood that since features of the fourth light emitting element 170, the fifth light emitting element 180, and the sixth light emitting element 190 are similar to those of the first light emitting element 110, the second light emitting element 120, and the third light emitting element 130, relevant descriptions are omitted herein.

In summary, the first light guide plate, the second light guide plate, and the third light guide plate are used in the backlight module according to the present invention. In detail, the first light guide plate, the second light guide plate, and the third light guide plate have different light emitting angles, and the light emitting angles of any two of the first light guide plate, the second light guide plate, and the third light guide plate can be superposed with each other by turning on any two of the first light emitting element, the second light emitting element, and the third light emitting element. Therefore, the backlight module according to the present invention can provide a function of multiple visual angles switching without reducing the brightness. In addition, because the inverse prism sheet is further used in the backlight module according to the present invention to reduce a light emitting angle of the backlight module, the backlight module according to the present invention further has the advantage of the small light emitting angle.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first light emitting element, the second light emitting element and the third light emitting element etc., which are only used for distinguishing various elements and do not limit the number of the elements.

What is claimed is:

1. A backlight module, comprising:
   a first light emitting element, a second light emitting element, and a third light emitting element;
   an inverse prismسheet; and
   a light guide assembly disposed opposite to the inverse prism sheet, the light guide assembly comprising:
   a first light guide plate having a first light incidence surface and a first surface, the first light incidence surface disposed opposite to the first light emitting element, the first surface connected to the first light incidence surface, and the first surface located at a side of the first light guide plate opposite to the inverse prism sheet, wherein the first surface is formed with a first sunken eye structure, and the first sunken eye structure has two first eye corner portions opposite to each other, a first long axis is formed by a connecting line between the two first eye corner portions, and the first long axis extends along a reference direction;
   a second light guide plate having a second light incidence surface and a second surface, the second light incidence surface disposed opposite to the second light emitting element, the second surface connected to the second light incidence surface, and the second surface located at a side of the second light guide plate opposite to the inverse prism sheet, wherein the second surface is formed with a second sunken eye structure, the second sunken eye structure has two second eye corner portions opposite to each other, and a second long axis is formed by a connecting line between the two second eye corner portions; and
   a third light guide plate having a third light incidence surface and a third surface, the third light incidence surface disposed opposite to the third light emitting element, the third surface connected to the third light incidence surface, and the third surface located at a side of the third light guide plate opposite to the inverse prism sheet, wherein the third surface is formed with a third sunken eye structure, the third sunken eye structure has two third eye corner portions opposite to each other, and a third long axis is formed by a connecting line between the two third eye corner portions; wherein an orthographic projection of the second long axis on the first surface and an orthographic projection of the third long axis on the first surface are respectively inclined towards two opposite sides of the reference direction.

2. The backlight module according to claim 1, wherein the first light guide plate further has a side surface and a first light emitting surface, the first light emitting surface is connected to the first light incidence surface and is opposite to the first surface, and the side surface is connected to the first light incidence surface, the first light emitting surface, and the first surface;
   an angle between the first long axis and a normal of the side surface is A1, wherein $80°\leq A1 \leq 100°$;
   an angle between the second long axis and the normal of the side surface is A2, wherein $100°<A2<180°$; and
   an angle between the third long axis and the normal of the side surface is A3, wherein $0°<A3<80°$.

3. The backlight module according to claim 2, wherein $130°<A2<140°$ and $40°<A3<50°$.

4. The backlight module according to claim 1, wherein the first light guide plate is closer to the inverse prism sheet than the second light guide plate and the third light guide plate.

5. The backlight module according to claim 1, wherein a number of the first sunken eye structure is plural, a number of the second sunken eye structure is plural, and a number of the third sunken eye structure is plural;
- the first sunken eye structures are disposed equidistantly or not equidistantly in a normal of the first light incidence surface;
- the second sunken eye structures are disposed equidistantly or not equidistantly in a normal of the second light incidence surface;
- the third sunken eye structures are disposed equidistantly or not equidistantly in a normal of the third light incidence surface.

6. The backlight module according to claim 5, wherein
the first sunken eye structures are disposed not equidistantly, and a distance between the first sunken eye structures at a part close to the first light incidence surface is larger than a distance between the first sunken eye structures at a part away from the first light incidence surface;
the second sunken eye structures are disposed not equidistantly, and a distance between the second sunken eye structures at a part close to the second light incidence surface is larger than a distance between the second sunken eye structures at a part away from the second light incidence surface;
the third sunken eye structures are disposed not equidistantly, and a distance between the third sunken eye structures at a part close to the third light incidence surface is larger than a distance between the third sunken eye structures at a part away from the third light incidence surface.

7. The backlight module according to claim 1, wherein
the first light guide plate further comprises a plurality of first light scattering microstructures, the first surface has a first close-to-light emitting element area and a first away-from-light emitting element area, the first close-to-light emitting element area is closer to the first light incidence surface than the first away-from-light emitting element area, the first sunken eye structures are formed in the first away-from-light emitting element area, and the first light scattering microstructures are located in the first close-to-light emitting element area;
the second light guide plate further comprises a plurality of second light scattering microstructures, the second surface has a second close-to-light emitting element area and a second away-from-light emitting element area, the second close-to-light emitting element area is closer to the second light incidence surface than the second away-from-light emitting element area, the second sunken eye structures are formed in the second away-from-light emitting element area, and the second light scattering microstructures are located in the second close-to-light emitting element area;
the third light guide plate further comprises a plurality of third light scattering microstructures, the third surface has a third close-to-light emitting element area and a third away-from-light emitting element area, the third close-to-light emitting element area is closer to the third light incidence surface than the third away-from-light emitting element area, the third sunken eye structures are formed in the third away-from-light emitting element area, and the third light scattering microstructures are located in the third close-to-light emitting element area.

8. The backlight module according to claim 1, further comprising a fourth light emitting element, a fifth light emitting element, and a sixth light emitting element, wherein:
the fourth light emitting element and the first light emitting element are disposed on two opposite sides of the first light guide plate;
the fifth light emitting element and the second light emitting element are disposed on two opposite sides of the second light guide plate;
the sixth light emitting element and the third light emitting element are disposed on two opposite sides of the third light guide plate.

9. The backlight module according to claim 1, further comprising a reflective plate disposed on a side of the light guide assembly opposite to the inverse prism sheet.

* * * * *